United States Patent Office 3,451,637
Patented June 24, 1969

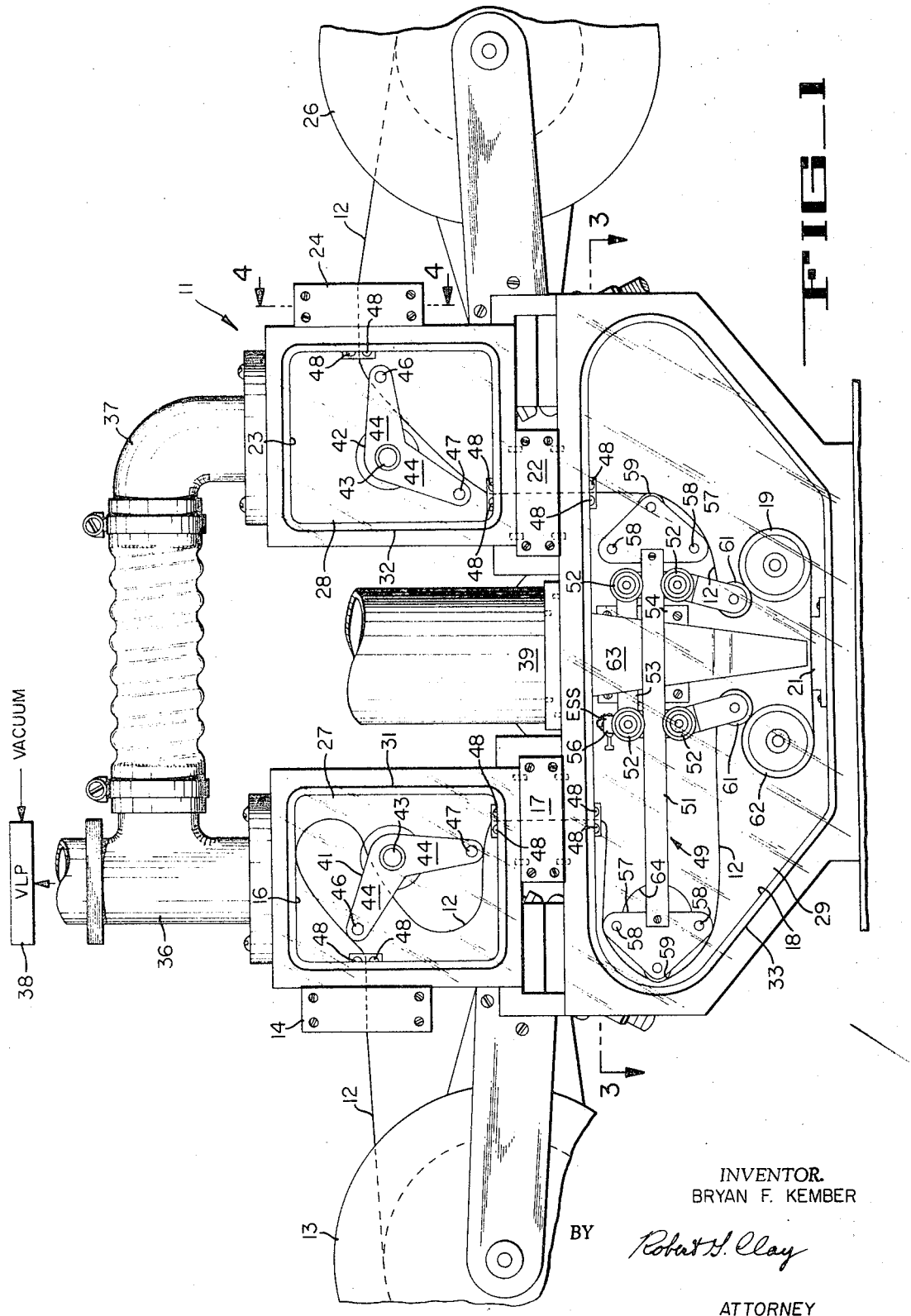

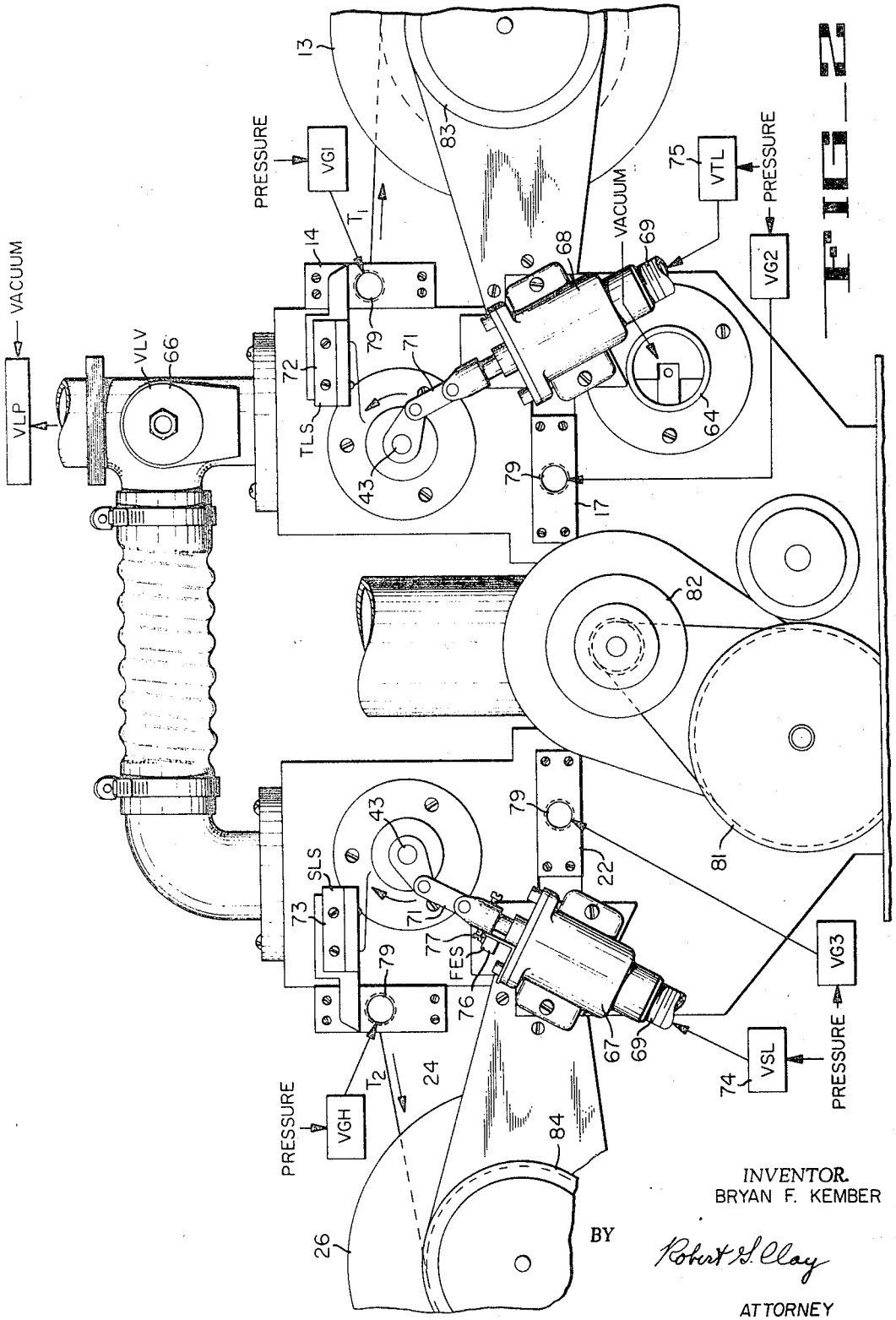

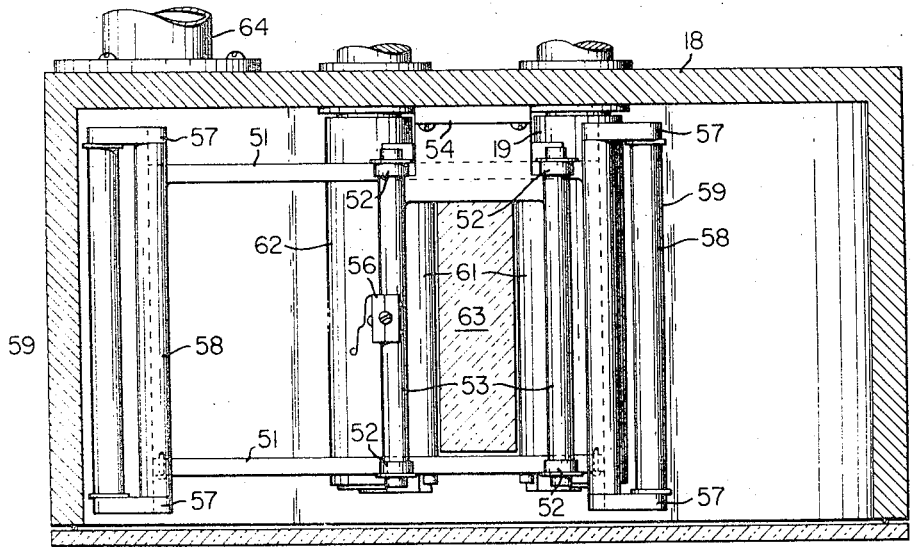
FIG_3
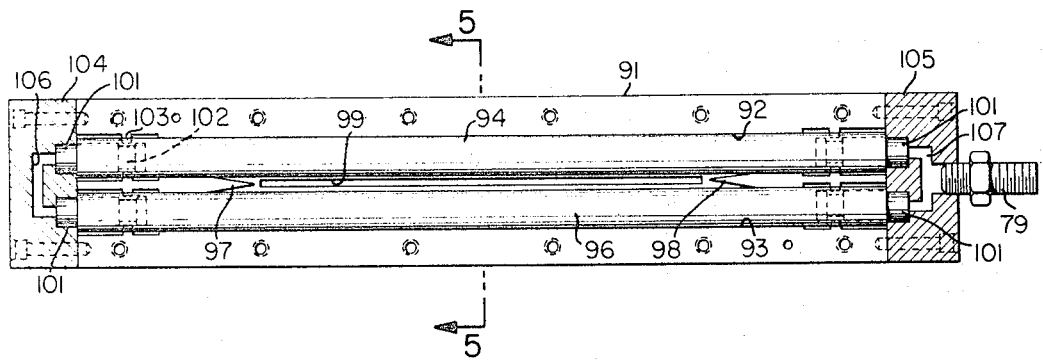
FIG_4
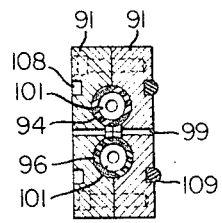
FIG_5
INVENTOR.
BRYAN F. KEMBER
BY Robert G. Clay
ATTORNEY

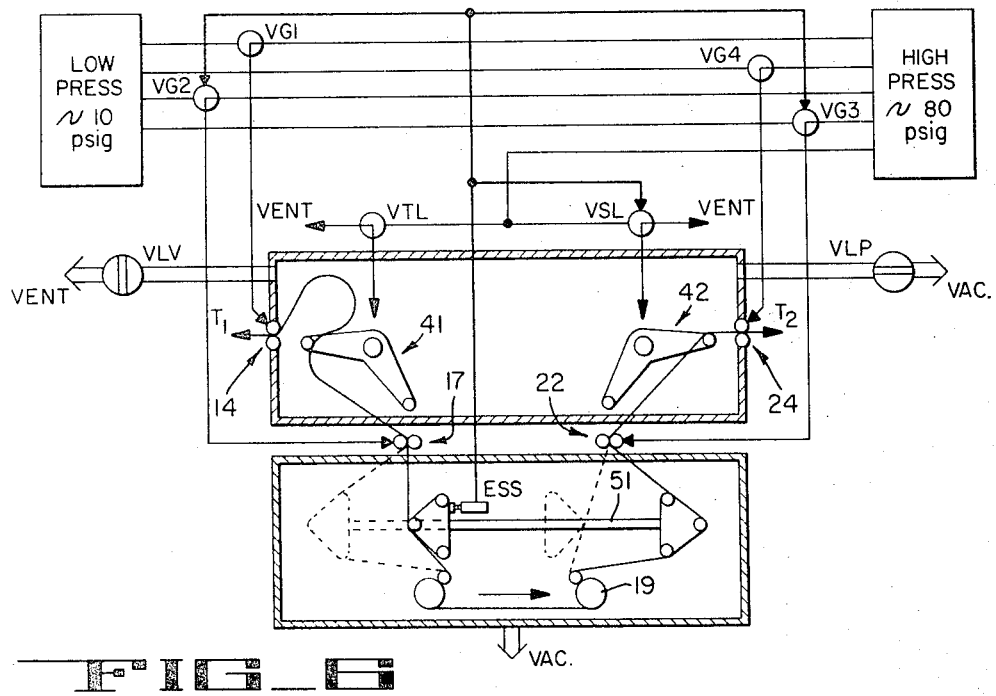
FIG_6
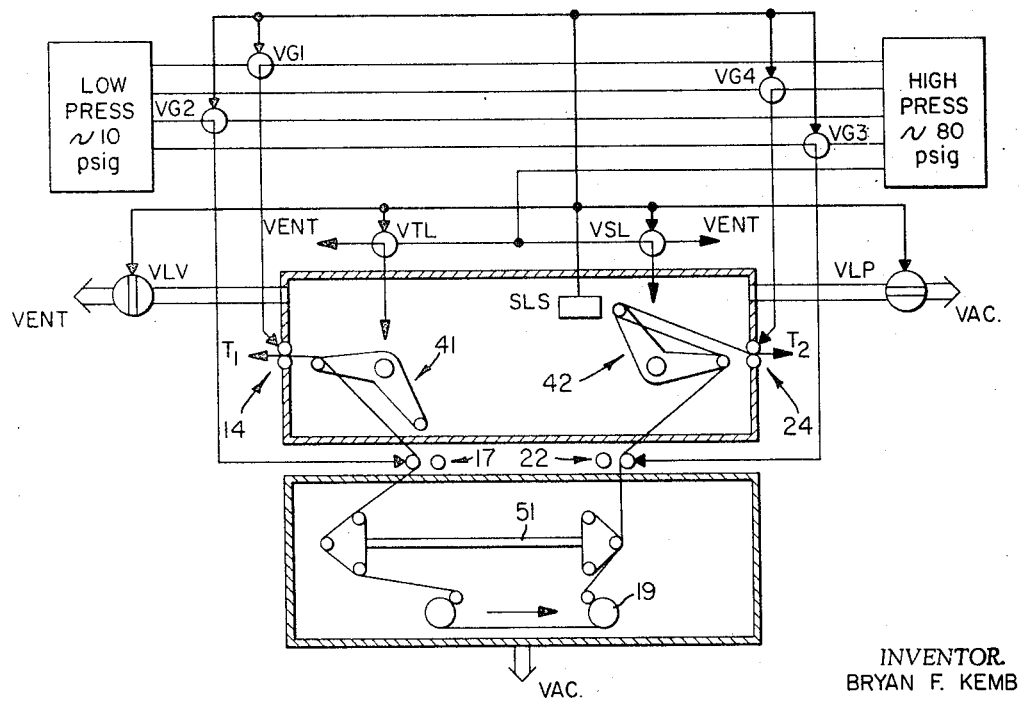
FIG_7

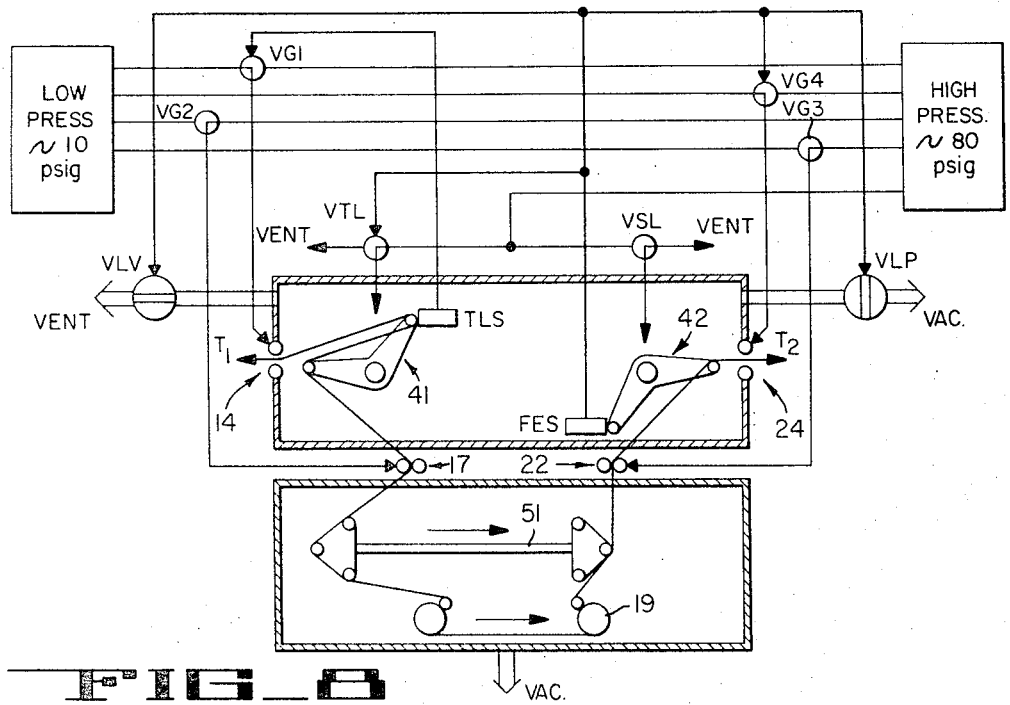

3,451,637
DIFFERENTIAL PRESSURE WEB TRANSPORT
Bryan F. Kember, Palo Alto, Calif., assignor to Ampex Corporation, Redwood City, Calif., a corporation of California
Filed Oct. 30, 1967, Ser. No. 678,936
Int. Cl. B65h 59/38, 17/42, 17/50
U.S. Cl. 242—75.5                                      11 Claims

ABSTRACT OF THE DISCLOSURE

A strip of photographic film is to be scanned by an electron beam in a vacuum, so as to read out the photographic frames in the form of an electric signal for television transmission. The film strip is threaded and fed from atmospheric pressure into an air lock chamber, thence into a vacuum processing chamber, thence back into the air lock, and thence to a take-up reel outside the air lock. The film passes into and out of each chamber through a gate that may be clamped shut to pinch the film and to provide a hermetical seal. The outer gates between the reels and air lock are opened for feeding film only while the inner gates between the air lock and processing chamber are closed, so that the processing vacuum is preserved. The air lock is then sealed and evacuated, and the inner gates are opened to feed and withdraw film to and from the processing chamber. In each feeding cycle, sufficient film is stored in the processing chamber to enable continuous processing until the next feeding cycle. The gates are each formed by a pair of rubber tubes positioned on either flat side of the film. The tubes are inflated to high pressure to close the gates, and are deflated to open the gates.

---

The invention herein described was made in the course of or under a contract or subcontract thereunder, with the Department of Defense.

Background of the invention

*Field.*—Selective electrical communications, with storage of signals.

*Prior art.*—U.S. Patents 3,308,444, 3,328,776, 3,328,777 and 3,333,254 disclose apparatus for "reading-out" recorded members by means of electron beams that scan the members. To avoid attenuation of the beam, the entire apparatus, including the entire recorded member, is enclosed in a vacuum chamber.

Summary of the invention

The present invention is intended for use with an elongated photographic film strip bearing the recorded information (e.g., a series of photographic pictures or "frames"). The film runs through a camera, where it is exposed, then immediately through a developing apparatus, and thence immediately through the vacuum chamber, where the photographs are read out by the scanning electron beam. The beam produces a signal in the nature of a television signal, which may be transmitted immediately to a receiving station and reproduced to provide a picture of much higher resolution than can be produced by an ordinary television camera. Since the entire film, together with the camera and the developing apparatus, cannot conveniently be enclosed in the vacuum chamber, it is necessary to thread and to move the film into, through, and out of the vacuum chamber, but without destroying the vacuum. This problem is not solved by the mentioned prior art. The solution adopted by the present invention is to thread and to move the film from the atmospheric environment of the camera and developing apparatus, into an air lock chamber, thence into a vacuum processing chamber, thence back into the air lock, and thence to a take-up reel outside the air lock. The film passes into and out of each chamber through a gate that may be clamped shut to pinch the film and to provide a hermetical seal. The outer gates between the reels and air lock are opened for feeding film only while the inner gates between the air lock and processing chamber are closed, so that the processing vacuum is preserved. The air lock is then sealed and evacuated, and the inner gates are opened to feed and withdraw film to and from the processing chamber. In each feeding cycle, sufficient film is stored in the processing chamber to enable continuous processing until the next feeding cycle. The gates are each formed by a pair of rubber tubes positioned on either flat side of the film. The tubes are inflated to high pressure to close the gates, and are deflated to open the gates.

The drawing

FIGURE 1 is a front elevation view of apparatus incorporating the invention, partly in schematic form;

FIGURE 2 is a back elevation view of the apparatus shown in FIGURE 1;

FIGURE 3 is a plan cross-sectional view, taken along the plane of lines 3—3 of FIGURE 1;

FIGURE 4 is an enlarged cross-sectional view taken along the plane of lines 4—4 of FIGURE 1;

FIGURE 5 is a cross-sectional view taken along the plane of lines 5—5 of FIGURE 4;

FIGURE 6 is a schematic view illustrating the operation of the invention;

FIGURE 7 is a schematic view illustrating the operation of the invention;

FIGURE 8 is a schematic view illustrating the operation of the invention; and

FIGURE 9 is a schematic circuit diagram illustrating the control apparatus of the invention.

Description of the preferred embodiments

Referring now to the drawing and particularly to FIGURE 1 thereof, there is shown a transport apparatus 11 for the vacuum processing of an elongated film strip 12. The film 12 bears recorded information, for example a series of photographic pictures or "frames," which have been recorded thereon by a photographic camera and developing apparatus, not here shown. The transport apparatus 11 is particularly adapted for receiving the film 12 immediately after it has been exposed and developed, and for reading out the photographs as by means of a scanning electron beam (not shown), so as to produce a signal in the nature of a television signal, that can be immediately transmitted to a receiving station for reproduction. The electron beam is used to read the photographs for the purpose of providing a reproduced picture of very much higher resolution than could be produced by an ordinary television camera; and it will be seen that if the film strip is continuously threaded through the camera, thence directly through the developing apparatus, and thence directly through the transport 11, the picture that is seen by the camera can be reproduced at the receiving station with only a very short time delay, depending upon the speed of movement of the film 12, and the distance that must be traversed between the camera and the transport 11.

For convenience of illustration and explanation, FIGURE 1 does not show the camera or the developing apparatus, but instead the film 12 is shown as coming from a supply reel 13, which is used to apply hold-back tension to the film, and is mounted on the frame of transport 11. The film is fed from the reel 13 through an entrance valve gate 14 and into an air lock chamber 16. The film is moved only intermittently into the air lock, and at such times the valve gate 14 is opened to permit substantially frictionless movement of the film. A concurrent feature of this movement, however, is that air from the atmosphere is also permitted to move into the air lock. Therefore, when a sufficient amount of film has been stored in the air lock, the valve gate 14 is closed to clamp the tape and seal the air lock hermetically. The air lock is then evacuated, and an inner valve gate 17 is opened to permit movement of the film from the air lock into an evacuated processing chamber 18. The valve gate 17 is then closed, gate 14 is opened and more film is fed into the air lock. In the processing chamber 18, sufficient tape is stored to permit a continuous steady movement of the film, driven by a capstan 19, past an electron beam reading head element 21, for a limited period of time. When all of the film that is stored upstream from the reading head 21 has been transferred to the downstream side of the reading head, the valve gate 17 is again opened and more film is fed into the processing chamber 18 from the now evacuated air lock 16. At the same time, a second inner valve gate 22 is opened and the processed film is fed from the processing chamber into a second exit air lock chamber 23, which at this time is also evacuated. The valve gate 22 is then closed, and a fourth or exit valve gate 24 is opened to permit withdrawal of the processed film from the air lock 23 to a take-up reel 26.

Thus, it may be seen that the film may be moved continuously and uninterruptedly past the reading head 21, without destroying the vacuum of the processing chamber 18, and also without causing any frictional wear of the film in the valve gates 14, 17, 22 and 24. At the same time, when required, the valve gates are adapted to provide air-tight seals of a simple and reliable nature.

Details of the construction of the transport are as follows. The air lock and processing chambers are covered at the front by transparent covers 27, 28 and 29, sealed by O-rings 31, 32 and 33, and are held in place during operation by the vacuum within the chambers. The air lock chambers are furnished with vacuum conduits 36 and 37, which are coupled in parallel to a VLP valve 38 communicating with a vacuum source (not shown). It will be understood that, because of this coupling, the two air lock chambers are really a single unit, and that the transport would operate satisfactorily if the two air lock chambers were combined into one (as shown in FIGURES 6–8); the chambers are separated in the apparatus of FIGURE 1 only to permit the placement, between them, of a mounting for a photomultiplier 39, which is used with the electron beam apparatus for reading out the film.

Likewise, the valves 14 and 24 could be combined into one, with the web entering and leaving the air lock through a single valve, and the same combination could be made of the valves 17 and 22.

Each of the air lock chambers has within it a stepping arm member 41, 42 which is mounted for pivoting motion on a shaft 43 extending through the back wall of the chamber. Each of the members 41, 42 has a pair of extending arms 44, bearing rollers 46 and 47 for manipulating the film. Entering the entrance air lock, the film passes between a pair of guide rollers 48, around the stepping arm roller 46, and beneath the stepping arm roller 47, thence between another pair of guide rollers 48, through the valve gate 17, and into the processing chamber between another pair of guide rollers 48. The arrangement of the film in the exit air lock chamber 23 is substantially the reverse. The storage of film in the processing chamber is provided for by means of a shuttle mechanism 49 comprising a frame 51 mounted for longitudinal sliding motion between rollers 52, which in turn are mounted on a framework 53, that is attached to the back wall of the chamber by means of a mounting plate 54. An ESS switch 56 is also mounted on the framework 53 in such a position as to be engaged and operated whenever the shuttle 49 reaches its right-hand limit of excursion. The portion of the shuttle that engages the switch 56 is shown as a left-hand bracket 57 that mounts a pair of guide pins 58 and a roller 59 around which the film is looped. A similar bracket 57 is mounted at the right-hand end of the shuttle. The film approaching the reading head 21 is also looped around a pinch roller 61 that is mounted on the framework 53, thence around an idler roller 62, thence across the head 21, around the capstan 19, thence around another pinch roller 61. The electron beam apparatus (not shown) is arranged beneath the head element 21, so as to direct the beam upwardly through a slot (not shown) from the element 21 and to impinge directly on the film 12. A light pipe 63 is mounted on the framework 53 above the head element 21 for the transmission of scintillation flashes to the photomultiplier 39. The remainder of the readout system is not herein described, because it does not form part of the present invention. Vacuum for the processing chamber 18 is drawn through an opening 64 in the back wall of the chamber.

Referring now to FIGURE 2, illustrating the back of the apparatus, there is shown a VLV valve 66 which is coupled to the vacuum conduit 36 of the air lock for rapid venting of the air lock in a manner to be later described. The actuating mechanism for the stepping arms 41 and 42 comprises a pair of air operated piston valves 67 and 68 to be supplied with high pressure air from a source (not shown) through conduits 69. Upon receiving pressurized air, the pistons are actuated to move upwardly and to operate a linkage 71 to rotate the shafts 43 of the arms 41 and 42 respectively counterclockwise and clockwise as seen in FIGURE 2. A pair of TLS and SLS microswitches 72 and 73 are mounted to be engaged and operated by the linkages of the arms 41 and 42 respectively, at the upper limits of their rotations. When the pressure of the piston valves 67 and 68 is cut off, as by means of a pair of VSL and VTL valves 74 and 75, the pistons and their associated stepping arms are retracted by spring elements (not here shown) mounted within the housing of the valves 67 and 68. In addition, an FES microswitch 76 is mounted on the housing of piston valve 67 in such a position as to be engaged and operated by a projecting bolt 77 on the piston rod of the valve when the piston returns to retracted position. The operation of this and the other switches described will be explained in greater detail below. Pressure for the valve gates 14, 17, 22 and 24 is supplied through conduits 79 projecting from the rear of the apparatus and leading to suitable control valves VG1, VG2, VG3 and VG4, and a pressure source not here shown. The capstan 19 is driven through a fly wheel 81 and a motor 82. A pair of torque motors 83 and 84 are coupled to the supply and take-up reels 13 and 26 respectively and are mounted to supply tensions $T_1$ and $T_2$ of the film outside the chambers.

Further details illustrating the mounting of the shuttle 49 and associated apparatus are shown in FIGURE 3.

The construction of the valve gates is illustrated in FIGURES 4 and 5. Within a split housing 91 are formed two spaced apart rounded grooves 92 and 93 in which are nested a pair of rubber tubes 94 and 96. Between the tubes, the housing is cut away from a point 97 to a point 98 so as to permit the tubes when filled with pressurized air to expand and to squeeze together in a pinching fashion. In the space between the tubes is formed a slot 99 passing all the way through the housing, for the passage of the film 12. Into the ends of the tubes are inserted coupling tubes 101, each having a reduced portion 102 near the inner end inside the rubber tube. The housing adjacent the ends of the tube is formed with interiorly projecting flanges 103 into which the reduced portions 102 of the coupling tubes 101 mate so as to seal the ends of the rubber tubes when the housing is closed. The ends of the coupling tubes 101 project into manifold members 104 and 105 which are bolted tightly to the ends of the housing 91. The manifold member 104 has an interior passageway 106 communicating between the ends of the two adjacent couplings 101; and the manifold member 105 has an interior passage 107 coupling the other pair of coupling tubes together and to the external pressure conduit 79 of the valve. Each of the housing members 91 has an exterior groove 108 for the seating of an O-ring 109 for sealing the valve to the adjacent chamber housing.

The operation of the apparatus is illustrated in FIGURES 1 and 6–9. Ordinarily, the apparatus is threaded and started in the position of FIGURE 1 (also shown in dashed lines in FIGURE 6), with the shuttle at the left-hand extremity of its path. Valves VG1, VG2, VG3 and VG4 are open to a source of high pressure (e.g., on the order of 80 p.s.i.g.), so that both the outer and inner gate valves (14, 24 and 17, 22 respectively) are closed. The air lock vent valve VLV is closed, and the air lock vacuum valve VLP is open to a vacuum source (not shown) that establishes a pressure of approximately 1,000 microns of mercury in the air lock chamber; and the processing chamber is continuously coupled to a vacuum source that maintains a presusre of approximately 100 microns of mercury therein. The supply and take-up reel torque motors are energized to provide exterior tensions $T_1$ and $T_2$ on the film; and the outgoing portion of film in the air lock is taut, while the incoming portion is threaded with a loose loop as shown. Both of the stepping arms are in the inactive position, with their piston actuating valves VTL and VSL closed (i.e., vented). Beginning from this position, the machine is set in motion as by energizing the capstan 19 motor so that the tape in the processing chamber is moved slowly from left to right past the processing transducer (not shown), and so that concomitantly the shuttle 51 is moved from left to right by the shortening left-hand portion of stored tape in the processing chamber. When the shuttle 51 reaches the right-hand extremity of its motion (FIGURE 6), the switch ESS is actuated by the shuttle and closed, so as to close the valves VG2 and VG3 and open the inner gate valves to allow movement of the film from the air lock into the processing chamber and from the chamber into the air lock. The vents of the valves VG2 and VG3 are thus coupled to a source of relatively low pressure (e.g., on the order of 10 p.s.i.g.) so as to restrict the opening of the corresponding gate valves to a dimension barely sufficient to permit the film to pass through without friction, but without permitting the passage of more air than is absolutely necessary (see FIGURE 7). The pressure of the low pressure source may be adjusted at any time during operation to obtain optimum performance of the gate valves. The closing with the ESS switch also opens the VSL valve to supply pressure to the exit stepping arm 42 actuating piston for the purpose of drawing the processed film from the processing chamber into the air lock. This operation is performed very quickly so as to keep the inner gate valves open for the shortest possible period, and has the effect of moving the shuttle rapidly back to its left-hand operating extremity, which again in turn draws the loose loop of film from the air lock into the processing chamber. At the end of this operation, the arrangement of the apparatus is substantially as shown in FIGURE 7.

The actual operation of the valves for the above described sequence of events is illustrated greater detail in FIGURE 9. Switch ESS is a normally open switch coupled in series between a direct current voltage source and a shuttle loading relay SLR, which when energized, locks itself in through its contacts 111 and a normally closed SLS switch. Another pair of SLR contacts 112 are closed upon energization to complete an alternating current circuit through the solenoids of VG2, VG3 and VSL. Thus the VG2 and VG3 valves (which are normally open) are closed, and the VSL valve (which is normally closed) is opened.

Referring now to FIGURE 7, as the exit stepping arm 42 reaches its fully actuated position, it engages and opens the normally closed SLS switch and produces the following sequence of operation. First, valves VG2 and VG3 are opened to the high pressure source so as to close the inner gate valves 17, 22. At the same time, valve VSL is closed (vented) so that the exit stepping arm is returned by its spring loaded piston to its unactuated position, slackening the portion of film that is soon to be pulled out of the air lock. Second, after a short delay (e.g., on the order of 0.1 second) the air lock vent valve VLV is opened to vent the air lock to atmosphere, and the air lock vacuum valve VLP is closed to shut off the vacuum. This delay in venting the air lock is for the purpose of making certain that the inner gate valves are fully closed, so as not to attenuate the vacuum of the processing chamber. Third, after another short delay (e.g., on the order of 0.2 second), the valves VG1 and VG4 are closed, to open the outer gate valves 14, 24 for feeding of the tape into and out of the air lock. The second delay referred to is for the purpose of making certain that the air lock is fully vented and at atmospheric pressure before the outer gate valves are opened. It has been found in practice that, if the outer gate valves are opened before the air lock is fully vented, the air rushing inwardly through the gate valves tends to cause severe vibration of the film and sometimes destruction thereof. Concurrently with the opening of the outer gate valves, the entrance stepping arm piston valve VTL is opened to high pressure so as to actuate the entrance stepping arm 41 to draw film into the air lock against the tension $T_1$ of the supply reel. Meanwhile, the take-up reel, exerting tension $T_2$ draws the exit portion of the film out of the air lock. As will be explained below in greater detail, the take-up reel torque motor is furnished at this moment with an extra torque impulse. When this sequence of events is completed, the arrangement of the apparatus is as shown in FIGURE 8.

The above-described second stage operation of the valves is illustrated further in FIGURE 9. When the normally closed SLS switch is opened, the SLR relay is dropped out, and its contacts are opened to deenergize the solenoids for valves VG2, VG3 and VSL. At the same time, the SLS switch is caused to complete a circuit through a second pair of contacts 113 thereof, and through a 0.1 second delay line 114 to energize a transport loading relay TLR, which when energized locks itself in through a pair of its own contacts 116 and the normally closed FES switch. A normally closed pair of TLR contacts 117 are thus opened to break a normally completed circuit from the alternating current source through the solenoid of the normally closed VLP valve, so that this valve is closed to vacuum. At the same time, the TLR contacts 117 are caused to complete an alternating current circuit through the solenoid of the normally closed VLV valve, which is thus opened. With the energization of the TLR relay, another pair of its normally open contacts 118 are closed to complete a circuit through a second (0.2 second) delay line 119 to energize a DLR relay, which does not lock itself, but remains energized so long as the TLR relay is energized. A pair of normally open DLR contacts 121 are thus closed to complete an alternating current circuit through the solenoids of the normally open VG4 valve and the normally closed VTL valve, causing them to close and to open, respectively. Another pair of normally open DLR contacts 122 are also closed to complete an alternating current circuit through a normally closed TLS switch and the solenoid of the normally open VG1 valve, which is thus closed. It will also be noted in FIGURE 9 that the take-up reel motor 84 is normally supplied with a low value of direct current through a resistor 123, so that when the motor is not actually pulling tape out of the air lock, the tape tension is not excessive. However, at this point, when tape is to be pulled out, another set of normally open DLR contacts 124 are closed to by-pass the resistor 123, and to supply the take-up reel motor with full power and maximum torque.

Referring now to FIGURES 8 and 9, the final stage in the sequence of operation is illustrated. As the entrance and exit stepping arms 41, 42 move to actuated and unactuated positions, respectively, it is desirable to close each of the outer gate valves 14, 24 separately as soon as the need for it to be opened is ended. Since the entrance stepping arm 14 usually ends its motion sooner, it is arranged to engage and open the TLS switch, immediately breaking the circuit to valve VG1 and opening the valve to higher pressure so as to close the entrance gate valve 14. Then, as the exit stepping arm 42 reaches its unactuated position, it engages and opens the FES switch, dropping out the TLR and DLR relays, so as to open the VG4 and VLP valves, close the VTL and VLV valves, and remove full power from the take-up reel torque motor 84. The opening and closing of the air lock and the feeding of tape into and out of the air lock is accomplished very quickly, so as to save the greatest possible amount of time for the pumping down of the air lock through the now open VLP valve, before the shuttle 20 reaches its righthand limit of operation. When the above described sequence of operation is completed, the apparatus is arranged as illustrated in FIGURE 6, ready to begin a new cycle.

What is claimed is:
1. Apparatus for processing web material in a non-atmospheric-pressure environment, of the type including an evacuated processing chamber enclosing a segment of said web and from which both ends of said web extend into an atmospheric-pressure environment, and capstan means in said chamber for moving said web longitudinally through said chamber, comprising:
  inner clamping valve means defining web entrance and exit orifice means for said chamber and operable to clamp the extending portions of said web and to hermetically seal the chamber;
  means within said chamber for storing web for processing movement by said capstan while said first valves are clamping said web;
  an air-lock chamber means exterior to said processing chamber and communicating therewith through said orifice means for storing web;
  outer clamping valve means defining air lock chamber entrance and exit orifice means for said web and operable to clamp said web and to hermetically seal said air lock chamber;
  means for feeding and withdrawing said web to and from said air lock chamber while said web in said processing chamber is being processed; and
  means for altering the pressure of said lock chamber and for feeding and withdrawing said web to and from said processing chamber;
whereby said web may be continuously processed without altering the pressure of said processing chamber.

2. Apparatus as recited in claim 1, wherein:
said means for storing web in said processing chamber includes a sliding shuttle member engaging said web both upstream and downstream from said capstan, and operated by said web to slide toward the downstream side of said capstan as said web stored on the upstream side grows shorter, and to slide toward the upstream side as the web collected downstream from said capstan is shortened, as when said web is pulled from said processing chamber.

3. Apparatus as recited in claim 2, wherein:
said means for withdrawing said web from said processing chamber comprises a first pivoting arm mounted in said air lock chamber and engaging said web for pulling a loop of web into said air lock chamber whereby said shuttle member is operated by said web to slide toward said upstream side of said capstan and to pull said web from said air lock chamber into said processing chamber.

4. Apparatus as recited in claim 3, wherein:
said means for feeding said web into said air lock chamber comprises a second pivoting arm mounted in said air lock chamber and engaging said web for pulling a loop of web from said processing chamber into said air lock chamber.

5. Apparatus as recited in claim 4, wherein:
said means for withdrawing said web from said air lock chamber comprises a take-up reel exterior to said chambers and a motor coupled thereto to provide a predetermined tension in said web for pulling said web from said air lock chamber.

6. Apparatus as recited in claim 5, wherein:
timing means are provided for closing said clamping valves with web in said respective chambers, operating said capstan to move said web in said processing chamber downstream from said capstan, meanwhile operating said pressure-altering means to cause said air lock chamber to have the same pressure as said processing chamber, opening said inner clamping valves, and operating said first pivoting arm to move said web and shuttle, closing said inner clamping valves, operating said pressure-altering means to vent said air lock chamber, opening said outer clamping valves, operating said second pivoting arm and said take-up reel to move said web, and closing said outer clamping valves.

7. Apparatus as recited in claim 6, wherein:
said timing means includes means for introducing a first predetermined time delay between the closing of said inner clamping valves and the venting of said air lock chamber, and a second predetermined time delay between the venting of said air lock chamber and the opening of said outer clamping valves.

8. Apparatus as recited in claim 7, wherein:
said timing means includes means for maintaining a minimum predetermined torque in said take-up reel motor, and for applying a predetermined maximum torque to said motor when said outer clamping valves are open.

9. Apparatus as recited in claim 1, wherein:
each of said clamping valves includes a pair of resilient expandable tubes mounted transverse to the path of said web on either flat side of said path, means for maintaining said tubes at a predetermined minimum inflation pressure insufficient to cause pinching of said web, and means for applying a predetermined maximum inflation pressure to cause said tubes to close together, clamping said web and hermetically sealing the passage between said tubes.

10. Apparatus as recited in claim 9, wherein:
said tubes are mounted in spaced-apart relation in a housing having conforming recesses formed therein to limit the movement of said tubes away from one another, and a slot formed therebetween following said web path, for passage of said web through said housing.

11. Apparatus as recited in claim 1, wherein:
said inner clamping valve means includes a pair of clamping valves defining a pair of web entrance and exit orifices between said air lock chamber means and said processing chamber; and
said outer clamping valve means includes a pair of clamping valves defining a pair of web entrance and exit orifices between said air lock chamber and the ambient atmosphere.

References Cited

UNITED STATES PATENTS 2,630,484    3/1953    Groak.
3,227,805    1/1966    Lemelson.

ALLEN N. KNOWLES, *Primary Examiner.*

R. A. SCHACHER, *Assistant Examiner.*

U.S. Cl. X.R.

226—113, 114, 118